April 11, 1950
C. W. ROLL
2,503,771
OVEN WITH PAPER CONVEYER
Filed Dec. 29, 1944
3 Sheets-Sheet 1
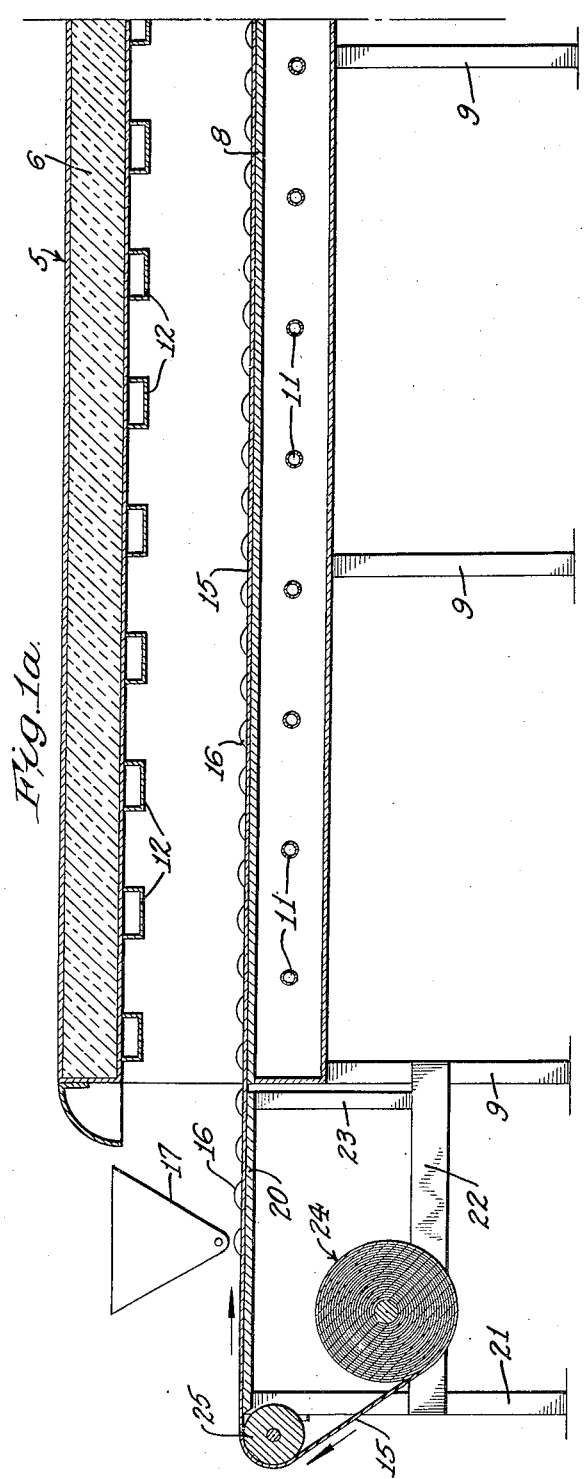
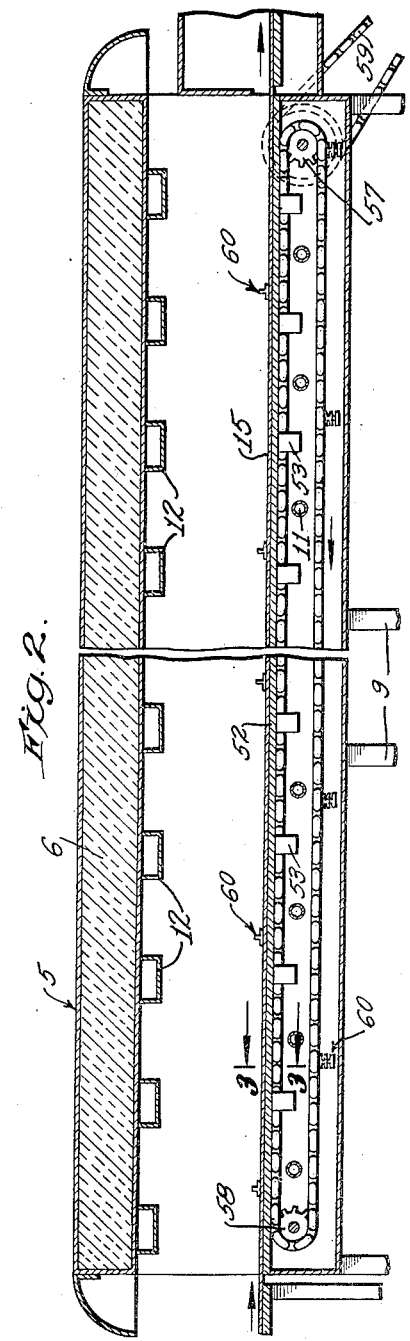
INVENTOR.
CARLTON W. ROLL
BY
Hoguet, Neary & Campbell
his ATTORNEYS

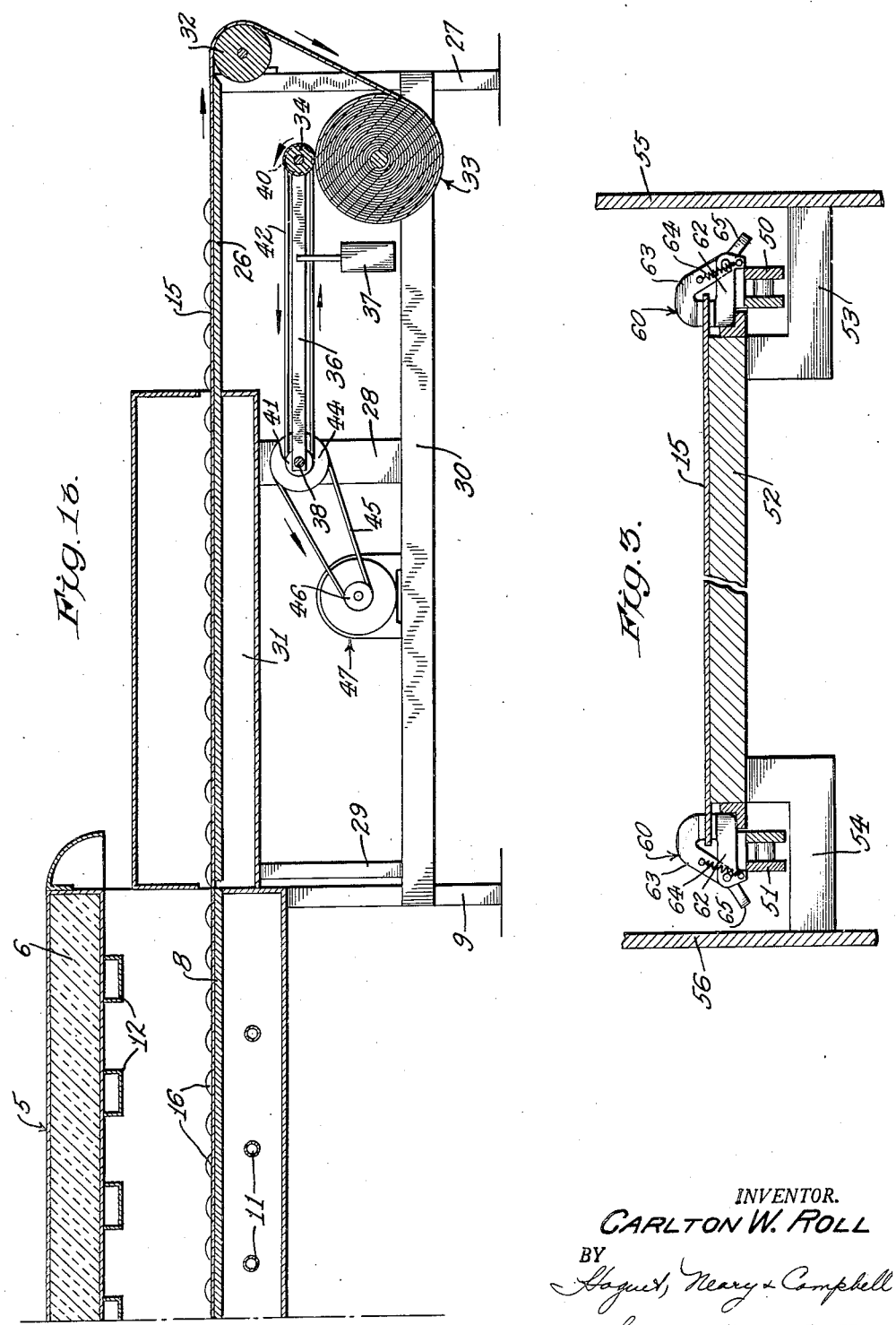

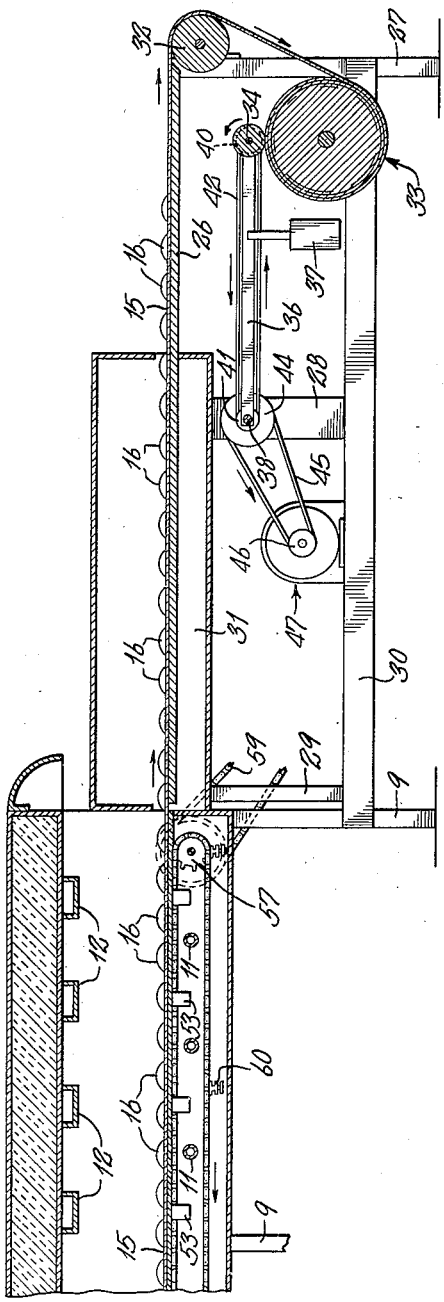

Patented Apr. 11, 1950

2,503,771

UNITED STATES PATENT OFFICE 2,503,771

OVEN WITH PAPER CONVEYER

Carlton W. Roll, Brooklyn, N. Y., assignor of one-half to Robert George White, Lynbrook, N. Y.

Application December 29, 1944, Serial No. 570,286

2 Claims. (Cl. 107—56)

This invention relates to improvements in baking ovens more particularly of the continuously operating type.

In ovens provided with a conveyor such as a band or strip made of metal, the band which also constitutes the hearth upon which the goods are baked must be relatively thick in order to support the baked goods and itself and consequently it will absorb a large amount of heat. The goods to be baked will therefore travel a considerable distance into the oven before thorough baking begins as the band must be "cold" when the goods is deposited on it. The front end section of the oven therefore serves primarily the purpose of heating this metal band to the baking temperature. The heat in the metal band which may be 30% of the heat of the oven is carried out of the oven and wasted.

The objects of this invention are to provide an oven which has none of these objectionable features and in the accomplishment of these objects, I provide a continuously moving conveyor made of a thin strip of material such as paper capable of absorbing only a small amount of heat and capable therefore of being raised to baking temperature at a point close to the mouth of the oven.

The strip of material is supported on a hearth having an uninterrupted supporting surface applying heat uniformly to the strip and at all sections of the length of strip within the oven. The strip is made of very thin material of just sufficient strength to convey the goods through the oven and allow the heat to be conducted through it from the hearth to the baked goods. The strip constitutes in effect a moving baking surface on the hearth and provides for constant changing positon of the baked goods with respect to the hearth. The baked goods are carried through a cooling and steaming tunnel to cool the baked goods and steam them off from the strip if necessary. These objects are preferably accomplished by using a long strip of material supplied from a roll and drawn through the oven by a take-up roll or sprocket chain driven by mechanism providing for a constant speed of travel of the strip.

Other objects of this invention will appear from the following description taken in connection with the drawings in which:

Figs. 1a and 1b taken together show the oven and appurtenances in longitudinal vertical section;

Fig. 2 shows a similar section of the oven illustrating a modified or auxiliary driving means for the conveyor, Fig. 3 is a transverse vertical section on the line 3—3 of Fig. 2.

Fig. 4 is a view similar to Figs. 1b and 2, showing the gripping means of Fig. 3 used with the conveyor of Figs. 1a and 1b.

For purposes of disclosure there is illustrated in Figs. 1a and 1b, an oven 5 the top and sides of which may be suitably insulated as at 6 and the hearth 8 of which comprises a sheet or plate of material suitable for this purpose and which is continuous longitudinally and transversely. The oven may be supported on legs 9. A series of burners 11 may be located below the hearth and another series of direct or radiant heat emitting burners 12 may be supported from the roof or crown over the hearth, equidistantly spaced along the length of the hearth with the burners 11 and 12 arranged in staggered relation with respect to each other. Means may be provided to control the burners.

The conveyor strip comprises a very thin strip of material 15 such as paper, which is caused to travel in contact with the hearth and transport the goods 16 to be baked, over the hearth and through the cooling and steaming tunnel. Any suitable depositor 17 may be provided to drop the goods on the conveyor strip.

The conveyor strip 15 directly below the depositor is supported by and moved over a platform 20 supported on legs 21 connected by cross pieces 22 to the legs 9 which support the oven. The inner end of the platform may be supported on standards 23 resting on the cross pieces 22. The conveyor strip is supplied from a paper roll 24 rotatably supported on the cross pieces 22 supporting the platform 20 and passes over a roller 25 supported on the legs 21 with its upper face in the plane of the upper face of the platform 20.

Adjacent the exit end of the oven, Fig. 1b, is a second platform 26 over which the conveyor strip passes as it leaves the oven. This platform is supported on legs 27 and on standards 28 and 29 supported on longitudinally extending bracing members 30 connecting legs 27 and 9. The left-hand end of the platform 26 may be supported on the walls of a cooling and steaming tunnel 31 supported on the standards 28 and 29.

The conveyor strip 15 passes over a roller 32 supported on the leg 27 and thence to a take-up roll 33 suitably supported on journals on the members 30.

For the purpose of providing a uniform rate of feeding of the conveyor strip, it is preferred to drive the take-up roll 33 by means of a friction driving roller 34 bearing on the outer layer of the strip on the take-up roll. The roller 34 is supported on the free end of a pivoted arm or frame 36 urged clockwise by a weight 37 and pivoted at 38 on the standard 28.

Coaxial with the roller 34 and the pivot 38 are pulleys 40 and 41 over which passes a driving belt 42. The pulley 40 is connected to the roller 34 and the pulley 41 is suitably connected to a large pulley 44 driven by a belt 45 from a pulley 46 on the shaft of a motor 47.

If desired and as shown in Figs. 2 and 3, the conveyor strip in continuous or in sectional sheet form may be fed through the oven by sprocket chains 50 and 51 located on opposite sides of a hearth 52 supported as by L members 53 and 54 on the side walls 55 and 56 of an oven. The sprocket chains pass over sprocket wheels 57 and 58 suitably journaled as in the walls of the oven and driven by a sprocket chain 59 from the motor 47. The sprocket chains 50 and 51 are equipped with gripping devices 60 each comprising a lower gripping element or base member 62 secured to the chain and with an upper gripping element 63 drawn toward the lower gripping element by a spring 64. The upper gripping member 63 may be provided with a tail 65 and suitable means such as cam elements or rails may be provided to cooperate with the tail 65 to raise the upper members and move them laterally to pass the paper as they are moved up at the left end of the oven and then to release them to grip the paper and then to again move them laterally at the right-hand or exit end of the oven. The means may operate to hold them withdrawn during their movement from right to left.

This grip feeding means as shown in Fig. 5 may be used as auxiliary feeding means for feeding the conveyor strip shown in Figs. 1a and 1b in which case this strip may be of minimum thinness, or it may be used as a means for feeding separate thin sheets of material through the oven.

The invention may be embodied in other forms within the scope of the appended claims.

I claim:

1. In combination with a stationary hearth provided with an upper smooth surface, a supply roll containing a long sheet of material, a take-up roll for said sheet, said sheet extending between said rolls in supporting contact with said surface, means for winding said sheet on said take-up roll at a constant rate of linear speed of said sheet, and continuously driven flexible means located on opposite sides of said hearth and having provision for engaging the edge section of said sheet for moving said sheet over said surface.

2. In combination with a stationary hearth provided with an upper smooth surface, a supply roll containing a long sheet of material, a take-up roll for said sheet, said sheet extending between said rolls in supporting contact with said surface, means for winding said sheet on said take-up roll at a constant rate of linear speed of said sheet, and continuously driven flexible means located on opposite sides of said hearth and gripping means carried by said flexible means for gripping the edge sections of said sheet.

CARLTON W. ROLL.

REFERENCES CITED

The following references are of record in the file of this patent:

UNITED STATES PATENTS

| Number | Name | Date |
| --- | --- | --- |
| 1,375,380 | Gates | Apr. 19, 1921 |
| 1,496,651 | Bentz | June 3, 1924 |
| 1,592,078 | Cano | July 13, 1926 |
| 1,667,765 | Bausman | May 1, 1928 |
| 1,680,979 | Gardner | Aug. 14, 1928 |
| 1,795,688 | Taroni | Mar. 10, 1931 |
| 1,970,900 | Renwick et al. | Aug. 21, 1934 |
| 2,120,829 | Bolling | June 14, 1938 |
| 2,129,796 | Swift | Sept. 13, 1938 |
| 2,196,000 | Richardson | Apr. 2, 1940 |